(12) United States Patent
Kim

(10) Patent No.: US 9,200,861 B1
(45) Date of Patent: Dec. 1, 2015

(54) AUTO CLEANER FOR GUN BARREL

(71) Applicant: In-Young Kim, Boryeong-si (KR)

(72) Inventor: In-Young Kim, Boryeong-si (KR)

( * ) Notice: Subject to any disclaimer, the term of this patent is extended or adjusted under 35 U.S.C. 154(b) by 0 days.

(21) Appl. No.: 14/625,172

(22) Filed: Feb. 18, 2015

(51) Int. Cl.
*F41A 29/02* (2006.01)

(52) U.S. Cl.
CPC ................................ *F41A 29/02* (2013.01)

(58) Field of Classification Search
CPC ......... F41A 29/02; F41A 29/00; F41A 29/04; F41A 35/00; B08B 9/0436; B08B 1/00; B08B 9/043; A46B 2200/3013
USPC .......... 15/104.16, 104.03; 102/442; 42/95, 84
See application file for complete search history.

(56) References Cited

U.S. PATENT DOCUMENTS

| | | | | |
|---|---|---|---|---|
| 944,008 A | * | 12/1909 | Bemis | 15/104.16 |
| 1,004,710 A | * | 10/1911 | Swazey | 15/104.05 |
| 1,145,626 A | * | 7/1915 | Stover | 15/104.16 |
| 1,196,467 A | * | 8/1916 | Lowell | 15/104.17 |
| 1,732,277 A | * | 10/1929 | Owens | 15/104.16 |
| 2,162,677 A | * | 6/1939 | Reynolds | 15/104.14 |
| 2,601,691 A | * | 7/1952 | Dyer | 15/104.2 |
| 2,958,884 A | * | 11/1960 | Hill et al. | 15/104.19 |
| 5,659,915 A | * | 8/1997 | Dhingra et al. | 15/104.095 |
| 8,695,264 B1 | * | 4/2014 | Blackburn et al. | 42/95 |
| 2006/0130251 A1 | * | 6/2006 | Bourrelly | 15/104.09 |
| 2006/0218735 A1 | * | 10/2006 | Parker-Smith | 15/104.05 |
| 2007/0294930 A1 | * | 12/2007 | Mays | 42/95 |
| 2011/0119845 A1 | * | 5/2011 | Kim | 15/104.05 |
| 2011/0179592 A1 | * | 7/2011 | An | 15/104.09 |
| 2013/0199072 A1 | * | 8/2013 | Richter | 42/95 |
| 2014/0150822 A1 | * | 6/2014 | Osaland | 134/8 |
| 2014/0338701 A1 | * | 11/2014 | Freytag | 134/8 |
| 2015/0059107 A1 | * | 3/2015 | An | 15/93.1 |

FOREIGN PATENT DOCUMENTS

KR  10-0963166 B1  6/2010

* cited by examiner

*Primary Examiner* — Joshua Freeman
(74) *Attorney, Agent, or Firm* — Novick, Kim & Lee, PLLC; Jae Youn Kim

(57) ABSTRACT

Provided is an auto cleaner for a gun barrel includes a main body having one end connected to a first cleaning unit and other end connected to a second cleaning unit, wherein the main body includes three shafts, a reciprocating unit, and a driving device. The auto cleaner may be used not only to automatically clean a gun barrel, but also to clean the inside of a pipe, such as a water supply or drainage pipe, or a boiler tube.

10 Claims, 6 Drawing Sheets

AUTO CLEANER FOR GUN BARREL

BACKGROUND

1. Field

One or more exemplary embodiments relate to a cleaner for cleaning the inside of a gun barrel, and more particularly, to an auto cleaner for a gun barrel, which may be used not only to automatically clean a gun barrel of a tank contaminated by firing or foreign external substances, but also to clean the inside of a pipe, such as a water supply or drainage pipe, or a boiler tube.

2. Description of the Related Art

A gun barrel is a metal pipe for determining a flying direction of a shell. The inside of a gun barrel of a self-propelled gun, a mortar, or a tank needs to be cleaned after usage. Otherwise, the performance of the gun barrel may deteriorate, and moreover, the gun barrel may explode. Currently, the number of people and time for cleaning the inside of the gun barrel are excessive, which increases the battle fatigue of military troops, thereby limiting the immediate defense readiness conditions.

A canon bore cleaning system has been introduced in KR 10-0963166.

SUMMARY

One or more exemplary embodiments include an auto cleaner for a gun barrel, which cleans the inside of a gun barrel regardless of a bore of the gun barrel by using cleaning units having various sizes, enables a user to observe an internal state of the gun barrel in real-time, is easily carried, and automatically cleans the inside of the gun barrel with use of small manpower by being directly connected to a car battery without having to use separate units for supplying power and operation.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
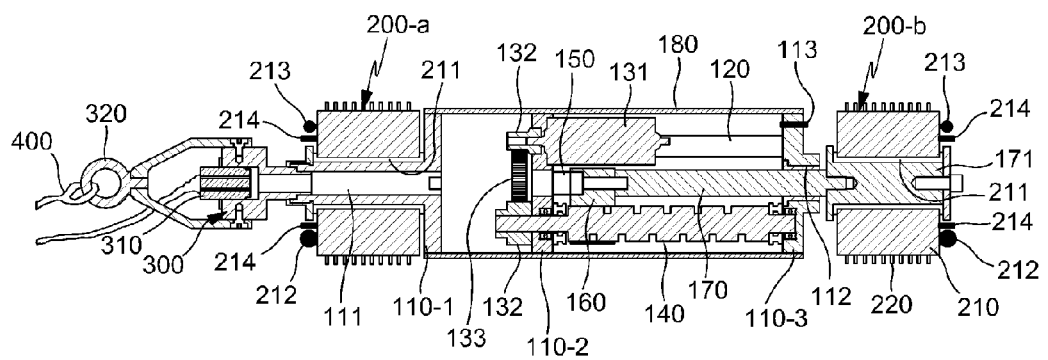
FIG. 1 is a cross-sectional view of an auto cleaner for a gun barrel, according to an embodiment of the present invention.

Reference will now be made in detail to embodiments, examples of which are illustrated in the accompanying drawings, wherein like reference numerals refer to like elements throughout.

Figure 2:
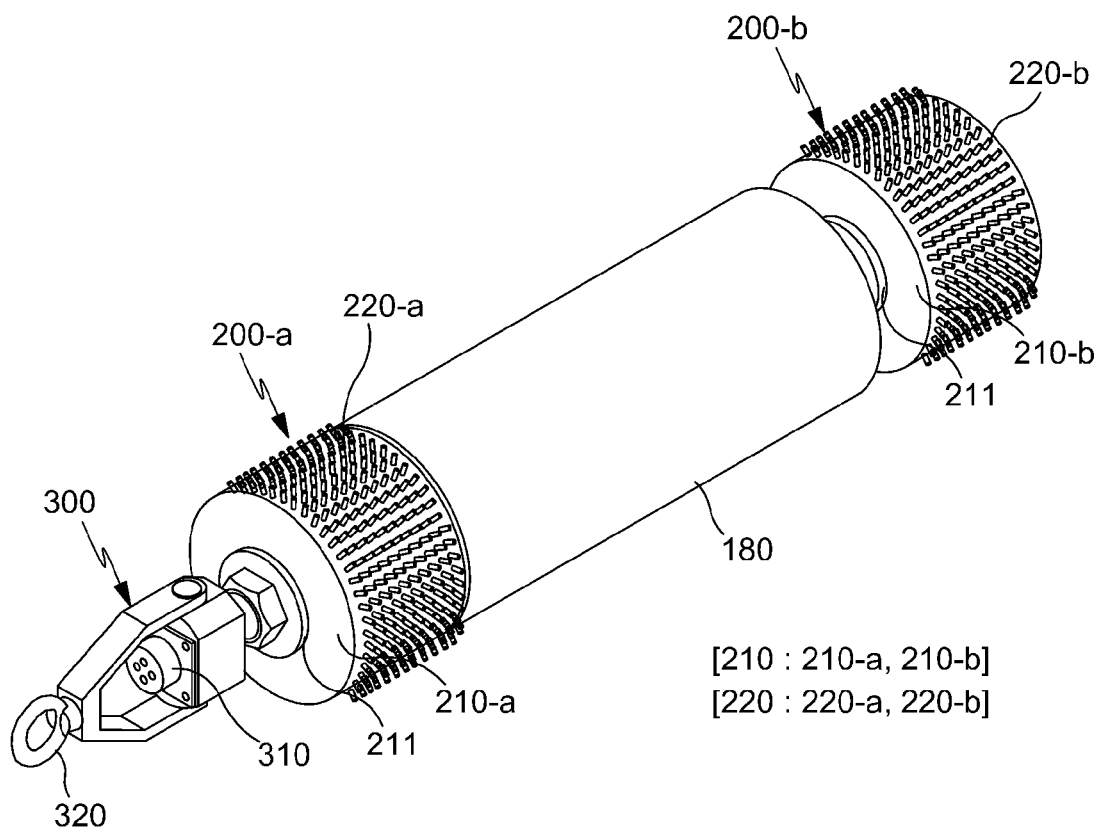
FIG. 2 is a diagram of an assembled state of an auto cleaner for a gun barrel, according to an embodiment of the present invention.

FIG. 1 is a cross-sectional view of an auto cleaner for a gun barrel, according to an embodiment of the present invention, and FIG. 2 is a diagram of an assembled state of the auto cleaner, according to an embodiment of the present invention.

Referring to FIGS. 1 and 2, the auto cleaner for a gun barrel, according to an embodiment of the present invention, may largely include a main body 100 and a cleaning unit 200.

The main body 100 includes a plurality of guide plates 110, i.e., first through third guide plates 110-1 through 110-3, a guide shaft 120, a driving device 130, a first shaft 140, a second shaft 150, a reciprocating unit 160, a third shaft 170, and a housing 180.

The cleaning unit 200 includes a first cleaning unit 200-*a* and a second cleaning unit 200-*b*, wherein each of the first and second cleaning units 200-*a* and 200-*b* includes a frame 210 and a cleaning brush 220. Since the first and second cleaning units 200-*a* and 200-*b* have the same structure, they will be commonly referred to as the cleaning unit 200 for convenience of description.

According to an embodiment of the present invention, the plurality of guide plates 110 are spaced apart from each other and include the first guide plate 110-1 that covers a left end of the housing 180, the second guide plate 110-2 that is provided inside the housing 180, and the third guide plate 110-3 that covers a right end of the housing 180, based on FIG. 1.

A plurality of the guide shafts 120 connect the first and second guide plates 110-1 and 110-2, and the second and third guide plates 110-1 and 110-3, and for simplification of drawings, only the guide shaft 120 connecting the second and third guide plates 110-2 and 110-3 is shown in FIG. 1.

A combining portion 111 protrudes from a center portion of the first guide plate 110-1 in an external direction of the housing 180, wherein the first cleaning unit 200-*a* is inserted around the combining portion 111 and a first fixing member 300 for fixing the main body 100 and the first cleaning unit 200-*a* is combined to an end of the combining portion 111. In other words, the first cleaning unit 200-*a* may be separated from the combining portion 111 after the first fixing member 300 is separated.

Also, a power supply unit 310 that supplies power to the driving device 130 included in the main body 100 is combined with a center of the first fixing member 300, and a latch 320 is combined with the first fixing member 300. A direction changing cable 400 for changing a proceeding direction of the auto cleaner is connected to the latch 320.

The direction changing cable 400 may be connected to a winder (not shown) disposed outside the gun barrel to be automatically or, if necessary, manually pulled. The winder may operate by receiving power from the same power supply source as the driving device 130. Alternatively, instead of using the direction changing cable 400, for example, a shaft may be directly combined with the first fixing member 300 and then the shaft may be moved forward or backward, thereby changing the proceeding direction of the auto cleaner.

A hole 112 through which the third shaft 170 penetrates is formed in a center portion of the third guide plate 110-3, and the third guide plate 110-3 includes at least one oil nozzle 113 that ejects oil, acting as a lubricant, into the inside of the gun barrel. Although not shown in FIG. 1, an oil storage unit (not shown) and an oil supply pipe (not shown) connecting the oil storage unit and the oil nozzle 113 are disposed inside the main body 100. The oil may be ejected not only manually but also periodically automatically by using a sensor and an automatic injection apparatus.

The driving device 130 is included in the second guide plate 110-2, and includes a motor 131, timing pulleys 132, and a belt 133. According to an embodiment, a decelerator (not shown) that adjusts a speed of the motor 131 may be included in the main body 100.

The timing pulleys 132 are respectively combined with the motor 131 and the first shaft 140, and the belt 133 connects the timing pulleys 132. When the motor 131 rotates, the timing pulley 132 combined with the motor 131 also rotates, and thus, the belt 113 provides rotatory power to the timing pulley 132 combined with the first shaft 140 to rotate the first shaft 140.

Figure 3:
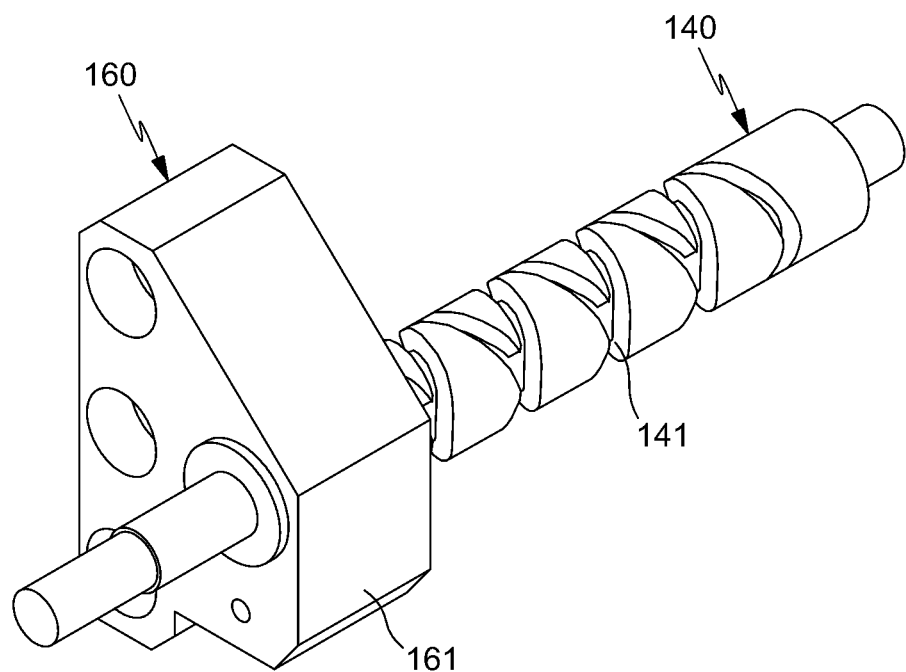
FIG. 3 is a diagram of a reciprocating unit assembled with a first shaft, according to an embodiment of the present invention.
Figure 4:
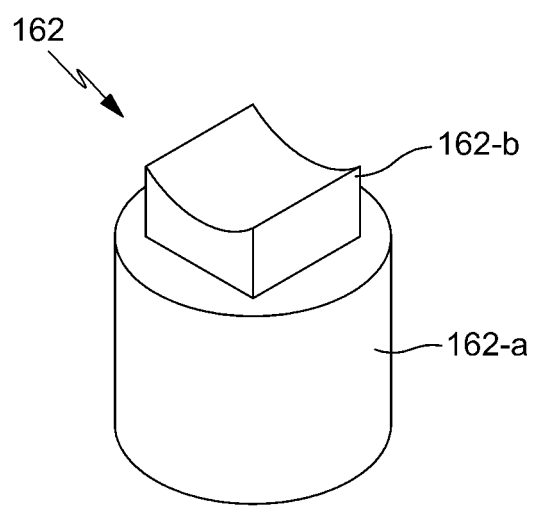
FIG. 4 is a perspective view of a rotating member according to an embodiment of the present invention.
Figure 5:
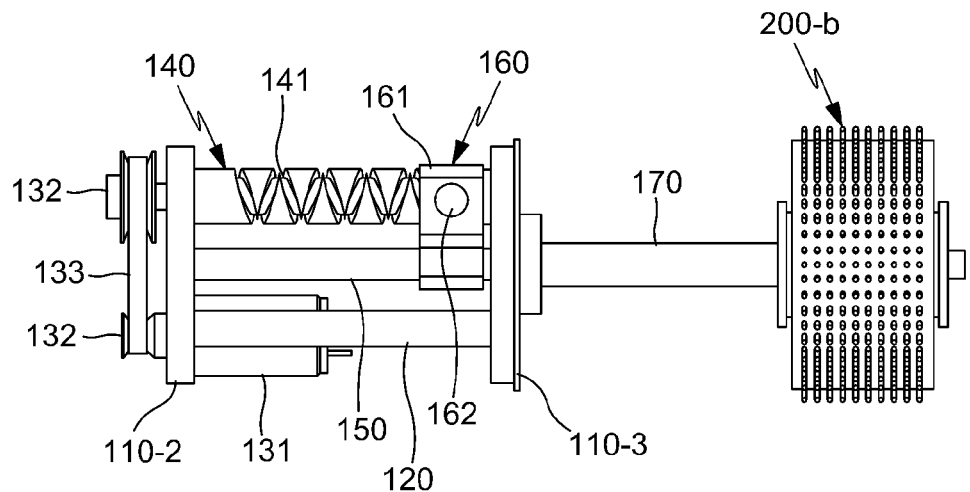
FIG. 5 is a diagram of a reciprocating unit that reached an end of a forward screw thread, according to an embodiment of the present invention.
Figure 6:
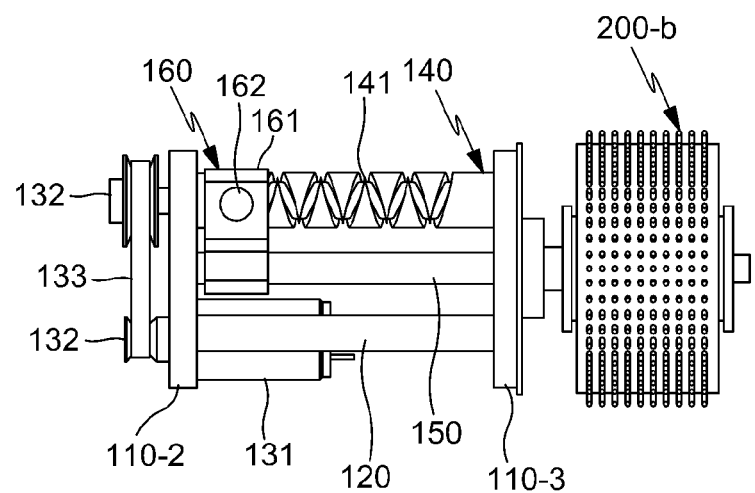
FIG. 6 is a diagram of a reciprocating unit that reached an end of a reverse screw thread, according to an embodiment of the present invention.

FIG. 3 is a diagram of the reciprocating unit 160 assembled with the first shaft 140, according to an embodiment of the present invention, FIG. 4 is a perspective view of a rotating member 162 according to an embodiment of the present invention, FIG. 5 is a diagram of the reciprocating unit 160 that reached an end of a forward screw thread, according to an embodiment of the present invention, and FIG. 6 is a diagram of the reciprocating unit 160 that reached an end of a reverse screw thread, according to an embodiment of the present invention.

An embodiment of the present invention will now be described with reference to FIGS. 1 through 6.

The opposite ends of the first shaft 140 are respectively rotatably combined with the second guide plate 110-2 and the third guide plate 110-3, and as described above, the first shaft 140 rotates by interlocking with the driving device 130. The opposite ends of the second shaft 150, in parallel to the first shaft 140, are respectively combined with the second guide plate 110-2 and the third guide plate 110-3.

The reciprocating unit 160 includes a body 161 and the rotating member 162, wherein a plurality of holes are formed in the body 161. The first and second shafts 140 and 150 may be inserted into and move along a respective hole, and the third shaft 170 is fixed to the body 161.

Forward and reverse screw threads 141 are formed on an outer circumferential surface of the first shaft 140. When the first shaft 140 rotates, the reciprocating unit 160 moves back and forth along the forward and reverse screw threads 141. The forward and reverse screw threads 141 are screw threads in which a forward screw thread and a reverse screw thread are alternately formed. The second shaft 150 inserted into the hole of the body 161 of the reciprocating unit 160 operates as a guide for the reciprocating unit 160 to move only back and forth linearly.

The rotating member 162 forming the reciprocating unit 160 moves along the forward and reverse screw threads 141 of the first shaft 140 while being combined with the body 161, such that the body 161 moves along the first shaft 140. Referring to FIG. 4, the rotating member 162 includes a cylindrical rotor 162-*a* that is combined with the body 161, and a pin 162-*b*.

The pin 162-*b* having an arch shape and located inside the forward and reverse screw threads 141 is combined with the cylindrical rotor 162-*a*.

Since the first shaft 140 rotates as the driving device 130 operates, the reciprocating unit 160 moves along the forward and reverser screw threads 141 of the first shaft 140 that is rotating and the second shaft 150.

When the pin 162-*b* included in the reciprocating unit 160 moves along the forward screw thread and reaches the end of the forward screw thread, the cylindrical rotor 162-*a* rotates such that the pin 162-*b* moves in an opposite direction along the reverse screw thread. Then, when the pin 162-*b* reaches the end of the reverse screw thread while moving along the reverse screw thread, the cylindrical rotor 162-*a* rotates such that the pin 162-*b* moves in an opposite direction along the forward screw thread. As such, the pin 162-*b* moves back and forth.

The third shaft 170 has one end combined with the reciprocating unit 160 and the other end combined with the second cleaning unit 200-*b* by a second fixing member 171. In other words, by separating a fixing screw of the second fixing member 171, the second cleaning unit 200-*b* may be separated from the third shaft 170. According to a movement of the reciprocating unit 160, the third shaft 170 moves back and forth linearly by passing through the hole 112 formed in the third guide plate 110-3.

The cleaning unit 200 will now be described in detail.

The cleaning unit 200 cleans an inner surface of the gun barrel by rotating along screw threads formed on the inner surface of the gun barrel.

A combining hole 211 having an inner diameter larger than a side circumference of the combining portion 111 or second fixing member 171 is formed in a center portion of the frame 210 forming the first and second cleaning units 200-*a* and 200-*b*. The cleaning brush 220 for cleaning the inner surface of the gun barrel is disposed outside the frame 210, wherein the cleaning brush 220 tilts in a direction opposite the forward direction of the auto cleaner and maintains the tilted direction unless an opposite artificial force is applied thereto. The frame 210 and the cleaning brush 220 may be formed of a synthetic resin or a metal material.

The frame 210 may include at least one of a photographing unit 212, a lighting unit 213, and a foreign substance removing unit 214. The photographing unit 212 and the lighting unit 213 may be separately provided in the frame 210, or the photographing unit 212 with which the lighting unit 213 is combined may be provided in the frame 210. A diameter of the bore of the gun barrel may vary, and the cleaning unit 220 having a size matching the bore of the gun barrel may be selected and used to automatically clean the gun barrel regardless of the bore of the gun barrel. In order to monitor an internal state of the gun barrel, a wireless camera may be used as the photographing unit 212 and a light-emitting diode (LED) device may be used as the lighting unit 213. In addition, an air ejecting device (not shown) may be used as the foreign substance removing unit 214.

The photographing unit 212, the lighting unit 213, and the foreign substance removing unit 214 may receive power from the same power supply source as the driving device 130, or may receive power through a power supply source separately provided in the frame 210.

The photographing unit 212 photographs the internal state of the gun barrel and transmits captured data to a server (not shown) via wires or wirelessly. Upon receiving the captured data from the server, a monitor display unit (not shown) may display the captured data such that a user may check the internal state in real-time. Alternatively, the photographing unit 212 and the monitor display unit may be directly connected to each other without having to use the server, such that the user may view the captured data in real-time. The monitor display unit may be a monitor of a computer or a mobile phone, but is not limited as long as the captured data is viewable.

The foreign substance removing unit 214 is used to remove foreign substances from the photographing unit 212 and the lighting unit 213, and as described above, the foreign substances may be removed by ejecting compressed air to the photographing unit 212 and the light unit 213 by using an air ejecting apparatus.

Referring to the above description, it would be obvious to one of ordinary skill in the art that the auto cleaner of the present invention may be used to clean the inside of a pipe, such as a water supply or drainage pipe, or a boiler tube, as well as the gun barrel.

Figure 7:
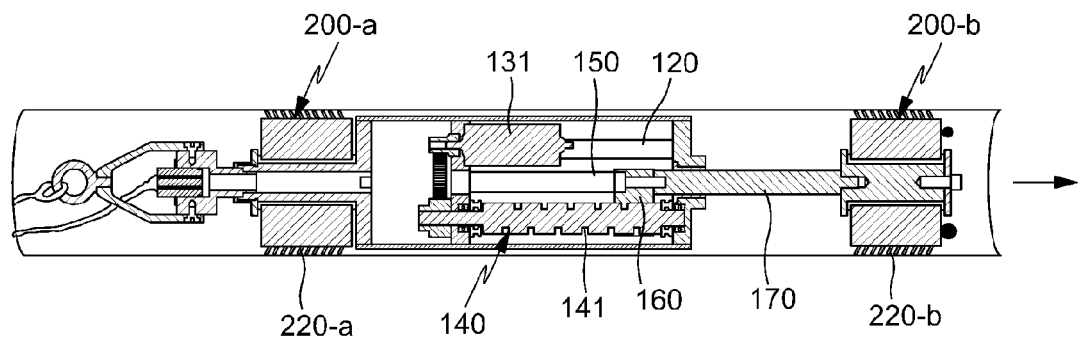
FIG. 7 is a diagram of an auto cleaner for a gun barrel, which primarily moved forward, according to an embodiment of the present invention.
Figure 8:
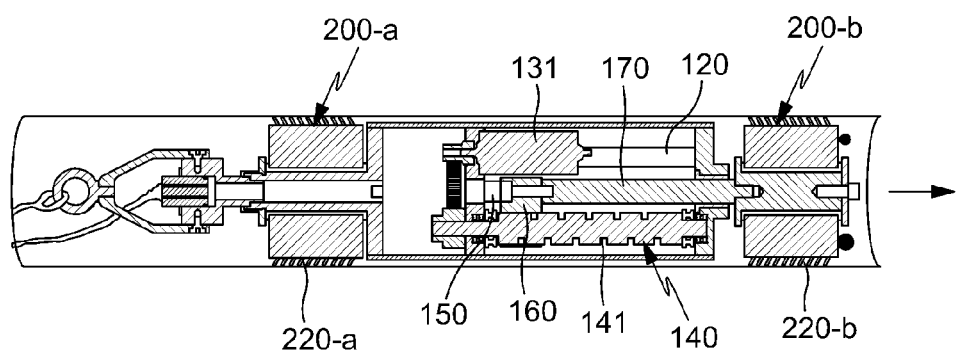
FIG. 8 is a diagram of an auto cleaner for a gun barrel, which secondarily moved forward, according to an embodiment of the present invention.
Figure 9:
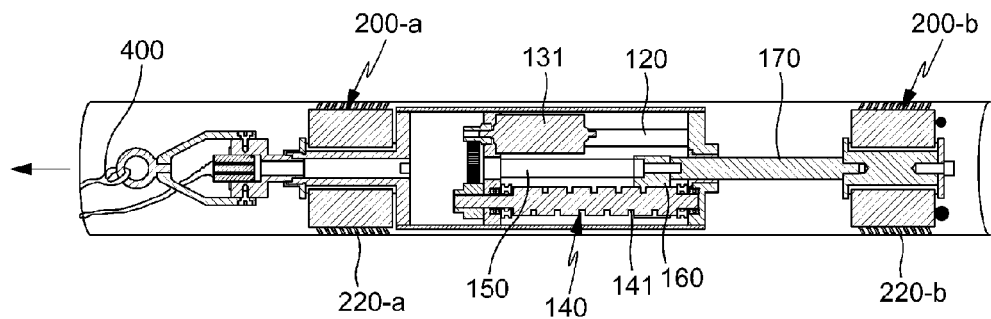
FIG. 9 is a diagram of an auto cleaner for a gun barrel, which primarily moved backward, according to an embodiment of the present invention.
Figure 10:
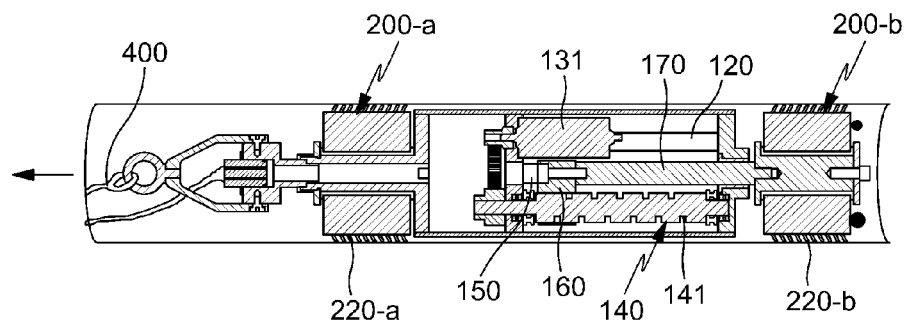
FIG. 10 is a diagram of an auto cleaner for a gun barrel, which secondarily moved backward, according to an embodiment of the present invention.

FIG. 7 is a diagram of the auto cleaner that primarily moved forward, FIG. 8 is a diagram of the auto cleaner that secondarily moved forward, FIG. 9 is a diagram of the auto cleaner that primarily moved backward, and FIG. 10 is a diagram of the auto cleaner that secondarily moved backward.

A movement method of the auto cleaner inside the gun barrel, which is described with reference to FIGS. 7 through 10, is based on the movement principle of a caterpillar.

First, a principle of the auto cleaner moving forward inside the gun barrel will now be described.

When the auto cleaner is inserted into the gun barrel, cleaning brushes 220-a and 220-b of the first and second cleaning units 200-a and 200-b tilt in a direction opposite a proceeding direction of the auto cleaner due to friction with the inner surface of the gun barrel. An initial location of the reciprocating unit 160 is shown in FIG. 8.

When the motor 131 rotates, the first cleaning unit 200-a is fixed due to friction between the cleaning brush 220-a of the first cleaning unit 200-a and the inner surface of the gun barrel, and the second cleaning unit 200-b operating based on a movement of the reciprocating unit 160 rotates and moves forward along the screw threads on the inner surface of the gun barrel.

After the reciprocating unit 160 reaches the end of the forward screw thread, the cylindrical rotor 162-a rotates so that the reciprocating unit 160 moves along the reverse screw thread. However, due to the friction between the cleaning brush 220-b of the second cleaning unit 200-b and the inner surface of the gun barrel, the second cleaning unit 200-b is fixed and stopped in the gun barrel. At this time, the first cleaning unit 200-a that is fixed to the inner surface of the gun barrel moves towards the second cleaning unit 200-b.

When the reciprocating unit 160 reaches the end of the reverse screw thread, the first cleaning unit 200-a is fixed again and the second cleaning unit 200-b moves forward.

In other words, the auto cleaner moves forward as a process of fixing the first cleaning unit 200-a and moving forward the second cleaning unit 200-b and a process of fixing the second cleaning unit 200-b that moved forward a predetermined distance and moving forward the first cleaning unit 200-a that was fixed are repeatedly performed.

In this case, the second cleaning unit 200-b does not move backward but is fixed since the friction between the inner surface of the gun barrel and the cleaning brush 220-b of the second cleaning unit 200-b, which is tilted in the direction opposite the proceeding direction, is larger than a force of the second cleaning unit 200-b moving backward.

A principle of the auto cleaner moving backward inside the gun barrel will now be described.

When the direction changing cable 400 is pulled automatically or manually, directions of the cleaning brushes 220-a and 220-b of the first and second cleaning units 200-a and 200-b are changed to be opposite the forward direction as shown in FIG. 9.

At this time, when the motor 131 rotates, the reciprocating unit 160 moves forward along the forward screw thread, but the second cleaning unit 200-b is fixed by friction between the inner surface of the gun barrel and the cleaning brush 220-b of the second cleaning unit 200-b, whereas the first cleaning unit 200-a is pushed backward towards an inlet of the gun barrel. Accordingly, the auto cleaner moves backward.

When the cylindrical rotor 162-a rotates and the reciprocating unit 160 moves along the reverse screw thread after the reciprocating unit 160 reaches the end of the forward screw thread, the first cleaning unit 200-a is fixed due to friction between the inner surface of the gun barrel and the cleaning brush 220-a of the first cleaning unit 200-a and a location of the second cleaning unit 200-b is changed as shown in FIG. 10.

The auto cleaner moves backward as the processes described above are repeated.

In this case, the second cleaning unit 200-b does not move forward but is fixed since the friction between the inner surface of the gun barrel and the cleaning brush 220-b of the second cleaning unit 200-b, which is tilted in the direction opposite the proceeding direction, is larger than a force of the second cleaning unit 200-b moving forward.

By using the auto cleaner for a gun barrel of the present invention, the inside of the gun barrel may be cleaned by employing a low number of people and without excessive time consumption, and thus, fatigue of military troops may be reduced. Also, foreign substances inside the gun barrel may be effectively removed since a cleaning state of the gun barrel may be observed in real-time.

Also, by selectively using any one of the cleaning units having various sizes, the auto cleaner may be used regardless of the bore of the gun barrel. Moreover, the auto cleaner may also be used to clean the inside of a pipe, such as a water supply or drainage pipe, or a boiler tube.

In addition, the auto cleaner may be easily carried and operated by being directly connected to a car battery without having to use a power supply source or a separate device.

While one or more exemplary embodiments have been described with reference to the figures, it will be understood by those of ordinary skill in the art that various changes in form and details may be made therein without departing from the spirit and scope of the inventive concept as defined by the following claims.

What is claimed is:

1. An auto cleaner for a gun barrel, the auto cleaner comprising a main body having one end connected to a first cleaning unit and another end connected to a second cleaning unit, wherein the main body comprises: a first shaft having one end combined to an inside of the main body and on which forward and reverse screw threads are formed; a second shaft having one end connected to the inside of the main body and provided in parallel to the first shaft; a reciprocating unit moving back and forth along the forward and reverse screw threads of the first shaft and the second shaft by being inserted into each of another end of the first shaft and another end of the second shaft; a third shaft having one end connected to the reciprocating unit and another end connected to the second cleaning unit, and moving the second cleaning unit according to a movement of the reciprocating unit; and a driving device rotating the first shaft in one direction.

2. The auto cleaner of claim 1, wherein each of the first and second cleaning units comprises:
 a hollow frame; and
 a cleaning brush combined outside the hollow frame for cleaning an inner surface of the gun barrel,
 wherein the cleaning brush tilts in a direction opposite a forward direction and maintains the tilted direction unless an opposite artificial force is applied thereto.

3. The auto cleaner of claim 1, wherein at least one of the first and second cleaning units comprises at least one of a photographing unit and a lighting unit.

4. The auto cleaner of claim 3, further comprising a monitor display; wherein at least one of the first and second cleaning units comprises a photographing unit; and wherein said monitor display receives and reproduces data captured by the photographing unit.

5. The auto cleaner of claim 4, further comprising a foreign substance removing unit that removes foreign substances attached to said at least one of a photographing unit and a lighting unit.

6. The auto cleaner of claim 1, wherein the main body further comprises at least one oil nozzle that sprays oil into the gun barrel.

7. The auto cleaner of claim 1, further comprising:
 a first fixing member that fixes the main body and the first cleaning unit; and
 a direction changing cable that is connected to the first fixing member to change a proceeding direction of the auto cleaner.

8. The auto cleaner of claim 1, wherein the first and second cleaning units are detachable.

9. The auto cleaner of claim 1, wherein the reciprocating unit comprises:
 a body into which the first and second shafts are inserted and with which the third shaft is combined; and
 a rotating member enabling the body to move along the first shaft by moving along the forward and reverse screw threads while being combined with the body.

10. The auto cleaner of claim 9, wherein the rotating member comprises:
 a cylindrical rotor; and
 an arched pin combined with the cylindrical rotor and disposed inside the forward and reverse screw threads.

\* \* \* \* \*